PULSE CODE MODULATION AND DIFFERENTIAL PULSE CODE MODULATION ENCODERS

Filed March 18, 1968 2 Sheets-Sheet 1

INVENTOR
H. S. McDONALD
BY H. L. Logan
ATTORNEY

United States Patent Office 3,526,855
Patented Sept. 1, 1970

3,526,855

PULSE CODE MODULATION AND DIFFERENTIAL PULSE CODE MODULATION ENCODERS

Henry S. McDonald, Murray Hill, N.J., assignor to Bell Telephone Laboratories, Incorporated, Murray Hill, N.J., a corporation of New York Filed Mar. 18, 1968, Ser. No. 713,891
Int. Cl. H03h *13/22*
U.S. Cl. 332—11 8 Claims

ABSTRACT OF THE DISCLOSURE

Differential pulse code modulation (DPCM) signals are produced by first subjecting an analog input signal to a delta modulator which is operated at many times the Nyquist rate of the signal. The modulator output is applied to an accumulator, which, in turn transfers its output to a storage register. The accumulator is strobed so that its contents are transferred at a rate at least equal to the Nyquist rate. The register is similarly strobed to produce its contents as DPCM signals.

Pulse code modulated (PCM) signals are produced by accumulating the DPCM signals in a second accumulator.

BACKGROUND OF THE INVENTION

Field of the invention

This invention relates to encoders for pulse code modulation (PCM) and differential pulse code modulation (DPCM).

Description of the prior art

Various signal sampling and encoding techniques are disclosed in the prior art. One general technique known as pulse code modulation (PCM) typically involves quantization of each signal sample, where each quantized sample is represented by a fixed number of binary code elements. The extent of quantization of course determines the number of code elements that appear in each encoded sample. The number of code elements required for each sample, in turn, is a basic factor in determining the efficiency with which such information can be transmitted.

In an effort to improve transmission efficiency when differences between quantized samples are relatively small, another technique known as differential PCM (DPCM) was devised. Under these conditions, the required number of code elements is reduced while retaining transmission quality. In particular, DPCM involves the transmission of code elements that represent changes in quantized levels. At the receiving terminal, these changes are added to synthesize the original sample.

A number of arrangemnts have been proposed to encode in PCM and DPCM forms. One obvious DPCM arrangement encodes each sample and then transmits the differences between successive encoded samples. Another obvious DPCM arrangement derives the differences in amplitudes between successive samples and then quantizes this difference. Still another arrangement is a hybrid of these two and is disclosed in U.S. Pat. 2,605,361 issued to C. C. Cutler on July 29, 1952. These and other prior art PCM and DPCM arrangements do, however, have a degree of complexity which at times detracts from their desirable aspects.

SUMMARY OF THE INVENTION

An object of the invention is to produce pulse code and differential pulse code modulation by relatively simple, inexpensive and easy to maintain encoders.

This and other objects are achieved in accordance with the invention by first delta modulating an analog signal at a rate many times the Nyquist rate of the signal. The binary delta modulation code elements are then summed during intervals occurring at least at the Nyquist rate of the analog signal. The sums thus produced are DPCM representations of the analog signal. PCM representations of the analog signal are produced by summing the DPCM representations.

A feature of the invention is the use of delta modulation. This operation immediately converts the analog signal to a digital form which permits all subsequent processing to be performed by digital circuits. These circuits, along with the delta modulator, are all relatively simple, inexpensive and easy to maintain, thus producing an overall combination having the same characteristics.

Other objects and features of the invention will become apparent from a study of the following detailed description of a specific embodiment.

DESCRIPTION OF THE DISCLOSED EMBODIMENT

Figure 1:
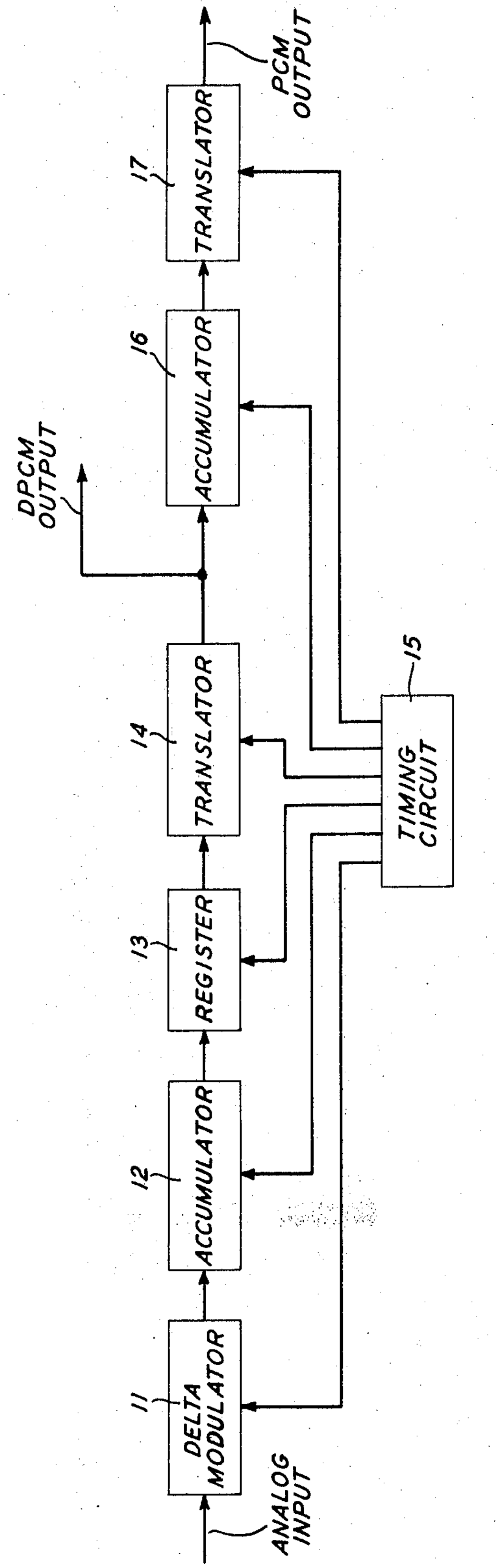
FIG. 1 shows a block diagram of an embodiment of the invention.
Figure 2:
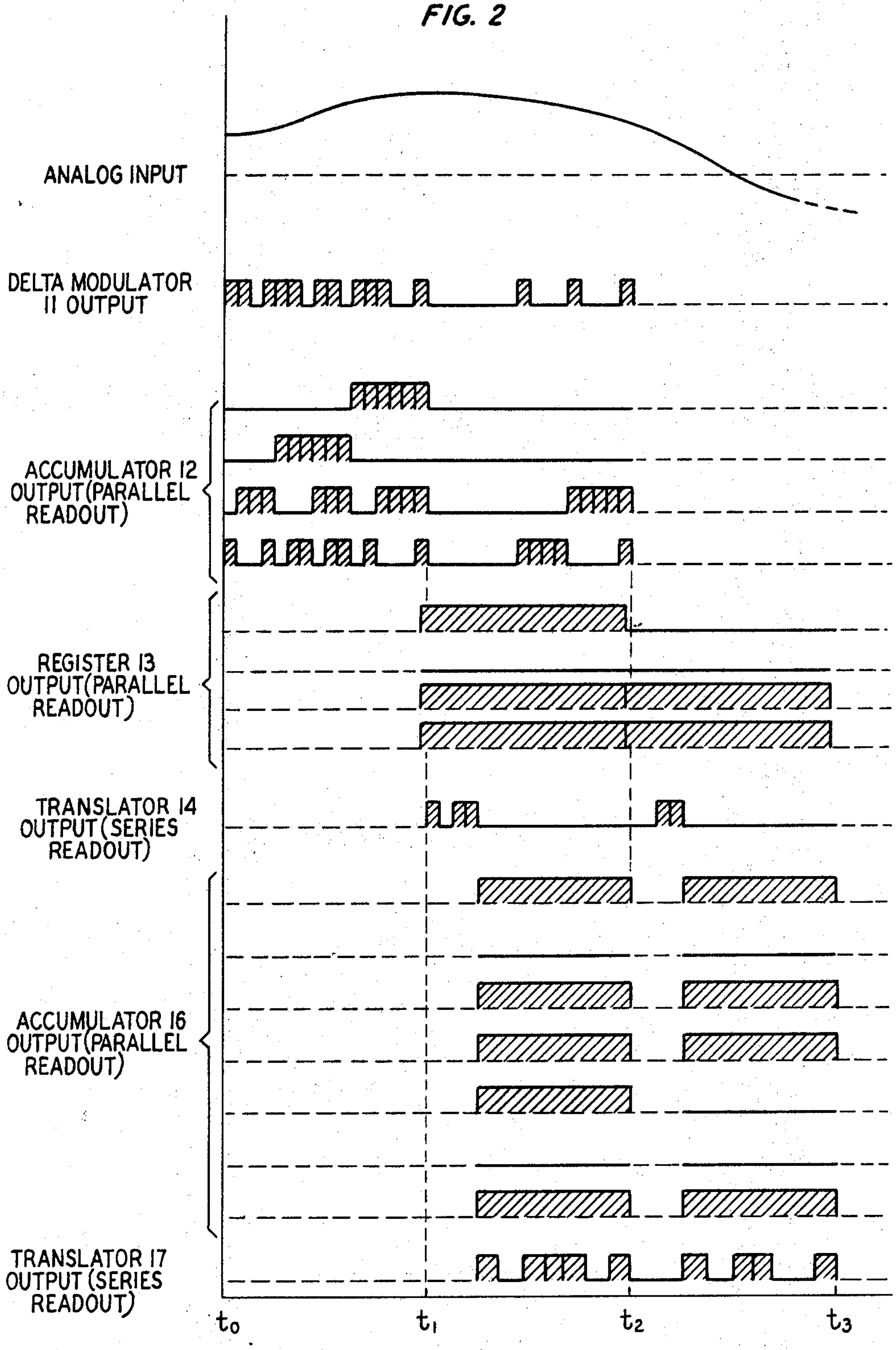
FIG. 2 shows typical waveforms appearing at identified locations within the embodiment of FIG. 1.

The embodiment shown in FIG. 1 comprises a conventional delta modulator 11 that receives an analog input and produces binary element outputs as shown in FIG. 2. These outputs are accumulated over predetermined time intervals in an accumulator 12. Such intervals are identified in FIG. 2 as $t_0$–$t_1$, $t_1$–$t_2$ and $t_2$–$t_3$. At the end of each predetermined time interval, the accumulator output is temporarily stored in a register 13. The accumulator output stored in register 13 is, in turn, applied to a translator 14 whose output comprises the embodiment's DPCM output. Modulator 11, accumulator 12, register 13 and translator 14 are all timed, in a manner to be described, by a timing circuit 15.

As mentioned above, modulator 11 is conventional. Its binary, or two types of, element outputs may take the form of pulses and no-pulses or positive and negative pulses. These element outputs are shown in FIG. 2 as pulses and no-pulses. As recognized by those skilled in the art, delta modulation produces one element per sampling of an analog input. These elements are used to produce an amplitude increase or decrease when reconstituting the analog signal. In the present embodiment, this sampling occurs at a rate at least equal to ($a^n$) times the Nyquist rate of the analog input where $a$ equals the number of types of code elements and $n$ equals the number of code elements in each DPCM output.

Accumulator 12 produces outputs which are coded representations of the numerical differences between the two types of modulator outputs occurring during the predetermined time intervals, respectively. Although the code employed and the number of elements in a representation are a matter of design restrictions and choice, a binary code using pulses and no-pulses with four elements for each representation is shown in FIG. 2. The accumulator may comprise an up-down counter that responds to both types of modulator outputs. It may also comprise a counter that responds to only one type of modulator output. In the latter case, the counter may be of the preset type or it may be followed by a subtract circuit that subtracts one-half of the maximum possible count from the actual count. As readily recognized, each of these configurations results in a different encoded output for a given input but this is not of any consequence because the selection of a coding scheme is arbitrary.

Register 13 is a temporary store that is timed to store only one accumulator output at a time, as is shown in FIG. 2.

Translator 14 places the accumulator output stored in register 13 on to an output line or lines. Translator 14 may take the form of a plurality of gates which are repetitively operated in a sequential manner by timing circuit 15 to feed out one code element at a time so that the elements appear in serial form at the output. Such a readout is shown in FIG. 2.

In accordance with the invention, PCM outputs are produced by summing the DPCM outputs in a second accumulator. In FIG. 1, this accumulator comprises an accumulator 16 which algebraically accumulates the DPCM outputs. The output of accumulator 16 is gated out by a translator 17 which performs in a manner similar to translator 14. Accumulator 16 and translator 17 outputs are also shown in FIG. 2. The number of code elements in each output is generally greater than the number of code elements in each output of accumulator 12 and translator 14 because one is an accumulation of the other. In FIG. 2 each output comprises seven elements of the binary pulse and no-pulse types.

To summarize, FIG. 2 shows delta modulator 11 as producing a number of pulse and no-pulse outputs during each time interval $t_0$–$t_1$ and $t_1$–$t_2$. Accumulator 12 accumulates the delta modulator outputs for each of the time intervals and produces a binary-coded parallel readout. Register 13 holds the output of accumulator 12 produced at the termination of each time interval so that accumulator 12 can start accumulating over the next time interval. Translator 14 translates the binary-coded parallel readout of register 13 into a binary-coded series readout which comprises the differential pulse code modulator (DPCM) outputs. Accumulator 16 accumulates the DPCM outputs and delivers the accumulation as a binary-coded parallel readout until the next translator 14 output appears. Translator 17 translates the parallel readout of accumulator 16 into a binary-coded series readout which comprises the pulse code modulation (PCM) outputs.

Although only one embodiment of the invention has been disclosed and described in detail, it is to be understood that various other embodiments may be devised by those skilled in the art without departing from the spirit and scope of the invention.

What is claimed is:

1. An encoder comprising
first means for periodically sampling an analog signal and producing an output at each sampling with these outputs being of first and second types which may be used to produce amplitude increases and decreases when used to reconstitute the analog signal,
second means connected to said first means to produce, after each interval in a series of equal time intervals, outputs having $n$ code elements of $a$ types where each output represents the difference between the numbers of said first and second types of first means outputs during the preceding interval, and
third means connected to said second means to make said intervals occur at a rate at least equal to the Nyquist rate of said analog signal and further connected to said first means to make the sampling rate of said first means at least equal to $a^n$ times the rate of said intervals.

2. An encoder in accordance with claim 1 in which said first means comprises a delta modulator and said second means comprises an accumulator.

3. An encoder in accordance with claim 1 in which a fourth means is connected to said second means to algebraically sum each new second means output with the sum of previous second means outputs and to produce each new sum as an output.

4. An encoder in accordance with claim 3 in which said first means comprises a delta modulator and each of said second and third means comprises an accumulator.

5. An encoder comprising
a delta modulator for periodically sampling and encoding an input analog signal where said modulator uses first and second types of elements for encoding,
first means connected to said modulator and reset at a rate at least equal to the Nyquist rate of said input analog signal to produce after each resetting an output having $n$ code elements of $a$ types and representative of the differences in the numbers of said first and second types of modulator elements between that resetting and the immediately preceding resetting, and
second means connected to said first means to reset said first means and further connected to said modulator to operate said modulator at a rate at least equal to $a^n$ times the rate at which said first means is reset.

6. An encoder in accordance with claim 5 in which a third means is connected to said first means to sum each new first means output with the sum of prior first means output and to produce each new sum as an output.

7. An encoder comprising
a delta modulator that produces first and second types of output elements,
first means connected to said modulator and operated in a cyclical manner to produce outputs each having $n$ code elements of $a$ types and representative of the differences in the numbers of said first and second types of modulator outputs occurring during each cycle, and
second means connected to said first means to operate said first means in a cyclical manner and further connected to said modulator to operate said modulator at a rate at least equal to $a^n$ times the rate at which said first means is operated.

8. An encoder in accordance with claim 7 in which a third means is connected to said first means to sum each new first means output with the sum of prior first means output and to produce each new sum as an output.

References Cited

UNITED STATES PATENTS

| | | | |
|---|---|---|---|
| 2,605,361 | 7/1952 | Cutler. | |
| 2,816,267 | 12/1957 | De Jager et al. | 332—11 |

ALFRED L. BRODY, Primary Examiner

U.S. Cl. X.R.

325—38